United States Patent
Zhang et al.

(10) Patent No.: US 10,860,681 B2
(45) Date of Patent: Dec. 8, 2020

(54) APPARATUS AND METHODS FOR MATRIX ADDITION AND SUBTRACTION

(71) Applicant: Cambricon Technologies Corporation Limited, Beijing (CN)

(72) Inventors: Xiao Zhang, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 45 days.

(21) Appl. No.: 16/171,926

(22) Filed: Oct. 26, 2018

(65) Prior Publication Data

US 2019/0065437 A1 Feb. 28, 2019

Related U.S. Application Data

(63) Continuation-in-part of application No. PCT/CN2016/081117, filed on May 5, 2016.

(30) Foreign Application Priority Data

Apr. 26, 2016 (CN) .......................... 2016 1 0266805

(51) Int. Cl.
*G06F 17/16* (2006.01)
*G06N 3/04* (2006.01)

(52) U.S. Cl.
CPC ............... *G06F 17/16* (2013.01); *G06N 3/04* (2013.01)

(58) Field of Classification Search
CPC . G06F 17/16; G06N 3/04; G06N 3/06; G06N 3/063
See application file for complete search history.

(56) References Cited

U.S. PATENT DOCUMENTS

| 4,888,679 | A | 12/1989 | Fossum et al. |
| 7,275,148 | B2 * | 9/2007 | Moyer ............... G06F 9/30043 |
| | | | 712/22 |
| 8,984,043 | B2 * | 3/2015 | Ginzburg ............. G06F 9/3001 |
| | | | 708/607 |

FOREIGN PATENT DOCUMENTS

| CN | 1584824 A | 2/2005 |
| CN | 1842779 A | 10/2006 |
| WO | WO 2017/185396 A1 | 11/2017 |

OTHER PUBLICATIONS

Altera, Nios II Custom Instruction User Guide, Altera Corporation, 2011 (Year: 2011).*

(Continued)

*Primary Examiner* — Andrew Caldwell
*Assistant Examiner* — Emily E Larocque
(74) *Attorney, Agent, or Firm* — Getech Law LLC; Jun Ye

(57) ABSTRACT

Aspects for matrix addition in neural network are described herein. The aspects may include a controller unit configured to receive a matrix-add-scalar instruction that includes an address of the first matrix and a scalar value. The aspects may further include a computation module configured to receive the first matrix from a storage device based on the address of the first matrix. The first matrix may include one or more first elements. The one or more first elements are arranged in accordance with a two-dimensional data structure. The computation module may be further configured to respectively add the scalar value to each of the one or more first elements of the first matrix in accordance with the matrix-add-scalar instruction to generate one or more second elements for a second matrix.

40 Claims, 5 Drawing Sheets

(56) References Cited

OTHER PUBLICATIONS

Altera, Instruction Set Reference, 2015 (Year: 2015).*
Severance, et al., "VENICE: A Compact Vector Processor for FPGA Applications", Department of ECE, UBC, Vancouver, Canada, 2012, 8 pages.
Severance, et al., "Embedded Supercomputing in FPGAs with the VectorBlox MXP Matrix Processor", University of British Columbia, VectorBlox Computing Inc., IEEE 2013, 10 pages.
Chou, et al., "VEGAS: Soft Vector Processor with Scratchpad Memory", Dept. of Elec. and Comp. Eng. University of British Columbia, Vancouver, Canada, FPGA 2011, 10 pages.
Liu, et al., "Accelerator Compiler of the VENICE Vector Processor", Dept. of ECE, UBC, Vancouver, Canada, FPGA 2012, 4 pages.
Application No. 16899907.6—European Search Report, dated Oct. 23, 2019, 6 pages.
PCT/CN2016/081117—International Search Report, dated Jan. 24, 2017, 8 pages. (no English translation).
201610266805.X—Office Action, dated May 24, 2019, 10 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages arid Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

* cited by examiner

APPARATUS AND METHODS FOR MATRIX ADDITION AND SUBTRACTION

CROSS-REFERENCE TO RELATED APPLICATIONS

The present invention is a continuation-in-part of PCT Application No. PCT/CN2016/081117, filed on May 5, 2016, which claims priority to commonly owned CN application number 201610266805.X, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities.

A known method to add matrices of a multilayer artificial neural network is to use a general-purpose processor. Such a method uses a general-purpose register file and a general-purpose functional unit to execute general-purpose instructions to perform matrix-addition operations in MNNs. However, one of the defects of the method is low operational performance of a single general-purpose processor which cannot meet performance requirements for usual multilayer neural network operations. When multiple general-purpose processors execute concurrently, the intercommunication among them also becomes a performance bottleneck.

Another known method to add matrices of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for matrix operations in a neural network. The example apparatus may include a controller unit configured to receive a matrix-addition instruction. The example apparatus may include a computation module configured to receive a first matrix and a second matrix from a storage device. The first matrix may include one or more first elements and the second matrix includes one or more second elements. The one or more first elements and the one or more second elements may be arranged in accordance with a two-dimensional data structure. The computation module may be further configured to respectively add each of the first elements to each of the second elements based on a correspondence in the two-dimensional data structure in accordance with the matrix-addition instruction to generate one or more third elements for a third matrix.

Another example apparatus may include a controller unit configured to receive a matrix-add-scalar instruction. The example apparatus may further configured a computation module configured to receive a first matrix and a scalar value from a storage device. The first matrix may include one or more first elements. The one or more first elements may be arranged in accordance with a two-dimensional data structure. The computation module may be further configured to respectively add the scalar value to each of the one or more first elements of the first matrix to generate one or more second elements for a second matrix.

Another example aspect of the present disclosure provides an example method for matrix operations in a neural network. The example method may include receiving, by a computation module, a first matrix and a second matrix. The first matrix may include one or more first elements and the second matrix includes one or more second elements. The one or more first elements and the one or more second elements may be arranged in accordance with a two-dimensional data structure. The example method may further include respectively adding, by the computation module, each of the first elements to each of the second elements based on a correspondence in the two-dimensional data structure to generate one or more third elements for a third matrix.

Another example method may include receiving, by a direct memory access unit, a first matrix and a scalar value. The first matrix includes one or more first elements. The one or more first elements may be arranged in accordance with a two-dimensional data structure. The example method may further include respectively adding, by the computation module, the scalar value to each of the one or more first elements of the first matrix to generate one or more second elements for a second matrix.

BRIEF DESCIPTIOIN OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Addition between two matrices in a neural network may be presented as follows: R=A+B, in which A represents a first matrix, B represents a second matrix, and R represents a result matrix. Similarly, subtraction between the two matrices may be presented as R=A−B. The first matrix and the second matrix may be structured to include m rows and n columns and may be referred to as an m×n matrix. In other words, both the elements of the first matrix and the second matrix may be arranged in a two-dimensional data structure that includes m rows and n columns. The first matrix A may be described as $$\begin{bmatrix} a_{11} & a_{12} & \cdots & a_{1i} & \cdots & a_{1n} \\ a_{21} & a_{22} & \cdots & a_{2i} & \cdots & a_{2n} \\ \vdots & \vdots & \vdots & \vdots & \ddots & \vdots \\ a_{j1} & a_{j2} & \cdots & a_{ji} & \cdots & a_{jn} \\ \vdots & \vdots & \vdots & \vdots & \vdots & \vdots \\ a_{m1} & a_{m2} & \cdots & a_{mi} & \cdots & a_{mn} \end{bmatrix}$$

and the second matrix B may be described as $$\begin{bmatrix} b_{11} & b_{12} & \cdots & b_{1i} & \cdots & b_{1n} \\ b_{21} & b_{22} & \cdots & b_{2i} & \cdots & b_{2n} \\ \vdots & \vdots & \vdots & \vdots & \ddots & \vdots \\ b_{j1} & b_{j2} & \cdots & b_{ji} & \cdots & b_{jn} \\ \vdots & \vdots & \vdots & \vdots & \vdots & \vdots \\ b_{m1} & b_{m2} & \cdots & b_{mi} & \cdots & b_{mn} \end{bmatrix}.$$

Figure 1:
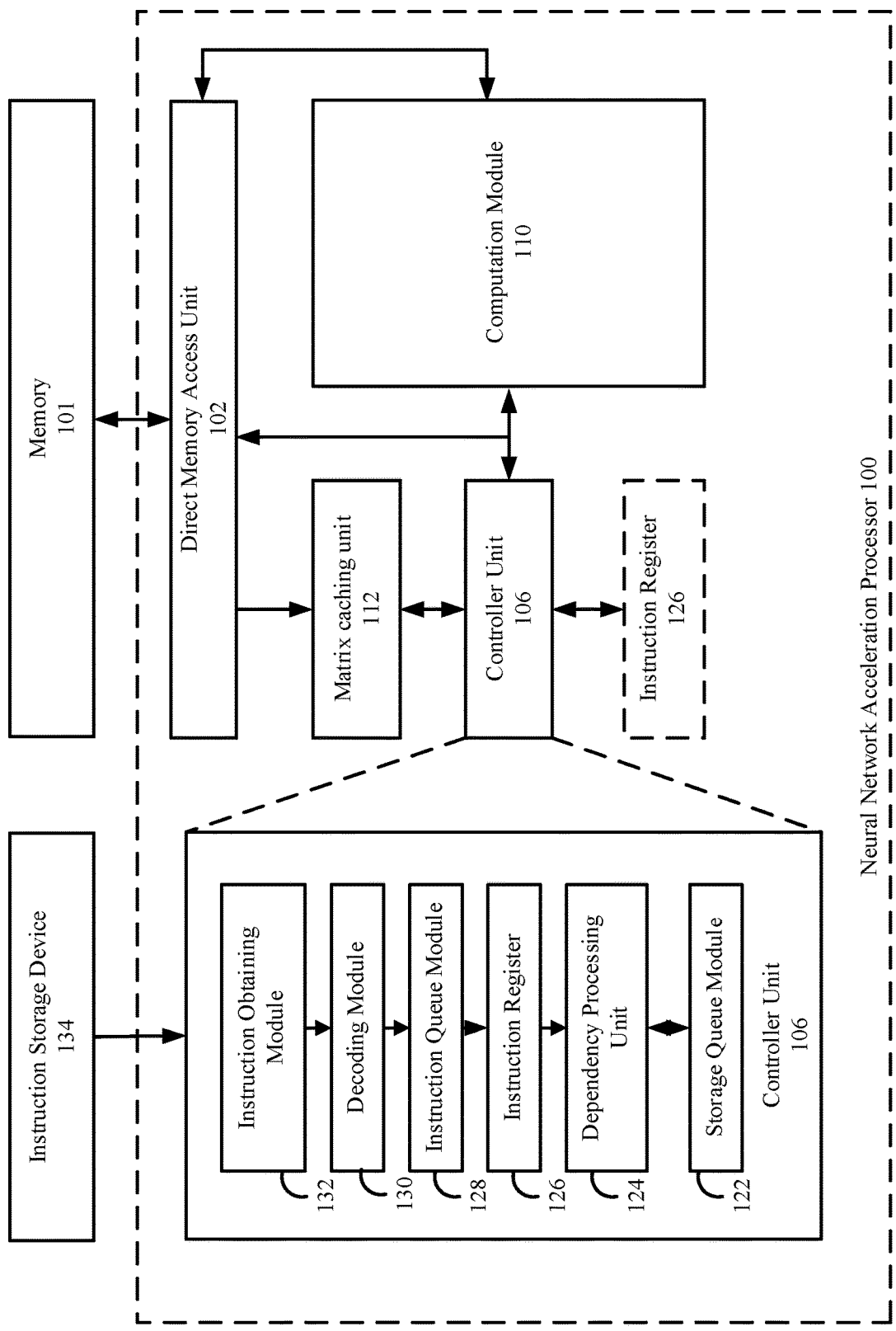
FIG. 1 illustrates a block diagram of an example neural network acceleration processor by which matrix operations may be implemented in a neural network.

FIG. 1 illustrates a block diagram of an example neural network acceleration processor by which matrix operations may be implemented in a neural network.

As depicted, the example neural network acceleration processor 100 may include a controller unit 106, a direct memory access unit 102, a computation module 110, and a matrix caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a matrix addition instruction may originate from an instruction storage device 134 to the controller unit 106. An instruction obtaining module 132 may be configured to obtain a matrix addition instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addressed in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a matrix-add-matrix (MAM) instruction, for example, may include a starting address of a first matrix, a length of the first matrix, a starting address of a second matrix, a length of the second matrix, and an address for a result matrix. As depicted, in some examples, the instruction register 126 may be implemented by one or more registers external to the controller unit.

The instruction register 126 may be further configured to store scalar values for the instruction. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode the instruction into micro-instructions for controlling operations of other modules including the direct memory access unit 102, the computation module 110, etc.

The direct memory access unit 102 may be configured to access an external address range (e.g., in an external storage device such as a memory 101) and directly read or write matrix data into respective caching units in the multiple computation modules 110 in accordance with the received instruction. Hereinafter, a caching unit (e.g., the matrix caching unit 112 etc.) may refer to an on-chip caching unit integrated in the neural network acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

For example, the direct memory access unit 102 may store data (i.e., elements) of the first matrix A and the second matrix B in the matrix caching unit 112 or other caching units in the computation module 110.

Upon receiving a matrix operation instruction from the controller unit 106, the computation module 110 may be configured to receive the data of the first matrix A and the second matrix B. Since the elements of the first matrix A and the second matrix B are both arranged and stored in a same m×n two-dimensional data structure, the computation module 110 may be configured to add each of the elements in the first matrix A to the elements in the second matrix B based on a correspondence in the two-dimensional data structure. For example, when the first matrix A may be described as $$\begin{bmatrix} a_{11} & a_{12} & \cdots & a_{1i} & \cdots & a_{1n} \\ a_{21} & a_{22} & \cdots & a_{2i} & \cdots & a_{2n} \\ \vdots & \vdots & \vdots & \vdots & \ddots & \vdots \\ a_{j1} & a_{j2} & \cdots & a_{ji} & \cdots & a_{jn} \\ \vdots & \vdots & \vdots & \vdots & \vdots & \vdots \\ a_{m1} & a_{m2} & \cdots & a_{mi} & \cdots & a_{mn} \end{bmatrix}$$

and the second matrix B may be described as $$\begin{bmatrix} b_{11} & b_{12} & \cdots & b_{1i} & \cdots & b_{1n} \\ b_{21} & b_{22} & \cdots & b_{2i} & \cdots & b_{2n} \\ \vdots & \vdots & \vdots & \vdots & \ddots & \vdots \\ b_{j1} & b_{j2} & \cdots & b_{ji} & \cdots & b_{jn} \\ \vdots & \vdots & \vdots & \vdots & \vdots & \vdots \\ b_{m1} & b_{m2} & \cdots & b_{mi} & \cdots & b_{mn} \end{bmatrix},$$

the computation module 110 may be configured to add the elements in the first matrix A and in the second matrix B correspondingly to generate a result matrix that may be described as $$\begin{bmatrix} a_{11}+b_{11} & a_{12}+b_{12} & \cdots & a_{1i}+b_{1i} & \cdots & a_{1n}+b_{1n} \\ a_{21}+b_{12} & a_{22}+b_{22} & \cdots & a_{2i}+b_{2i} & \cdots & a_{2n}+b_{2n} \\ \vdots & \vdots & \vdots & \vdots & \ddots & \vdots \\ a_{j1}+b_{j1} & a_{j2}+b_{j2} & \cdots & a_{ji}+b_{ji} & \cdots & a_{jn}+b_{jn} \\ \vdots & \vdots & \vdots & \vdots & \vdots & \vdots \\ a_{m1}+b_{m1} & a_{m2}+b_{m2} & \cdots & a_{mi}+b_{mi} & \cdots & a_{mn}+b_{mn} \end{bmatrix}.$$

Similarly, when the matrix operation instruction includes an operation code that instructs the computation module 110 to perform a subtraction between the two matrices ("matrix-minus-matrix" operation hereinafter), the computation module 110 may be configured to subtract the elements in the second matrix B from the elements in the first matrix A correspondingly to generate a result matrix that may be described as $$\begin{bmatrix} a_{11}-b_{11} & a_{12}-b_{12} & \cdots & a_{1i}-b_{1i} & \cdots & a_{1n}-b_{1n} \\ a_{21}-b_{12} & a_{22}-b_{22} & \cdots & a_{2i}-b_{2i} & \cdots & a_{2n}-b_{2n} \\ \vdots & \vdots & \vdots & \vdots & \ddots & \vdots \\ a_{j1}-b_{j1} & a_{j2}-b_{j2} & \cdots & a_{ji}-b_{ji} & \cdots & a_{jn}-b_{jn} \\ \vdots & \vdots & \vdots & \vdots & \vdots & \vdots \\ a_{m1}-b_{m1} & a_{m2}-b_{m2} & \cdots & a_{mi}-b_{mi} & \cdots & a_{mn}-b_{mn} \end{bmatrix}.$$

In an example wherein the matrix operation instruction instructs the computation module 110 to add a scalar value to the first matrix A, the computation module 110 may be configured to first duplicate the scalar value (hereinafter "S") to each element of the second matrix B and then similarly add the elements in the first matrix A to the second matrix B to generate a result matrix as $$\begin{bmatrix} a_{11}+S & a_{12}+S & \cdots & a_{1i}+S & \cdots & a_{1n}+S \\ a_{21}+S & a_{22}+S & \cdots & a_{2i}+S & \cdots & a_{2n}+S \\ \vdots & \vdots & \vdots & \vdots & \ddots & \vdots \\ a_{j1}+S & a_{j2}+S & \cdots & a_{ji}+S & \cdots & a_{jn}+S \\ \vdots & \vdots & \vdots & \vdots & \vdots & \vdots \\ a_{m1}+S & a_{m2}+S & \cdots & a_{mi}+S & \cdots & a_{mn}+S \end{bmatrix}.$$

Similarly, the computation module 112 may also be instructed to perform an operation to subtract a scalar value ("S") from the first matrix A ("matrix-minus-scalar" operation hereinafter) to generate a result matrix as $$\begin{bmatrix} a_{11}-S & a_{12}-S & \cdots & a_{1i}-S & \cdots & a_{1n}-S \\ a_{21}-S & a_{22}-S & \cdots & a_{2i}-S & \cdots & a_{2n}-S \\ \vdots & \vdots & \vdots & \vdots & \ddots & \vdots \\ a_{j1}-S & a_{j2}-S & \cdots & a_{ji}-S & \cdots & a_{jn}-S \\ \vdots & \vdots & \vdots & \vdots & \vdots & \vdots \\ a_{m1}-S & a_{m2}-S & \cdots & a_{mi}-S & \cdots & a_{mn}-S \end{bmatrix}.$$

Figure 2:
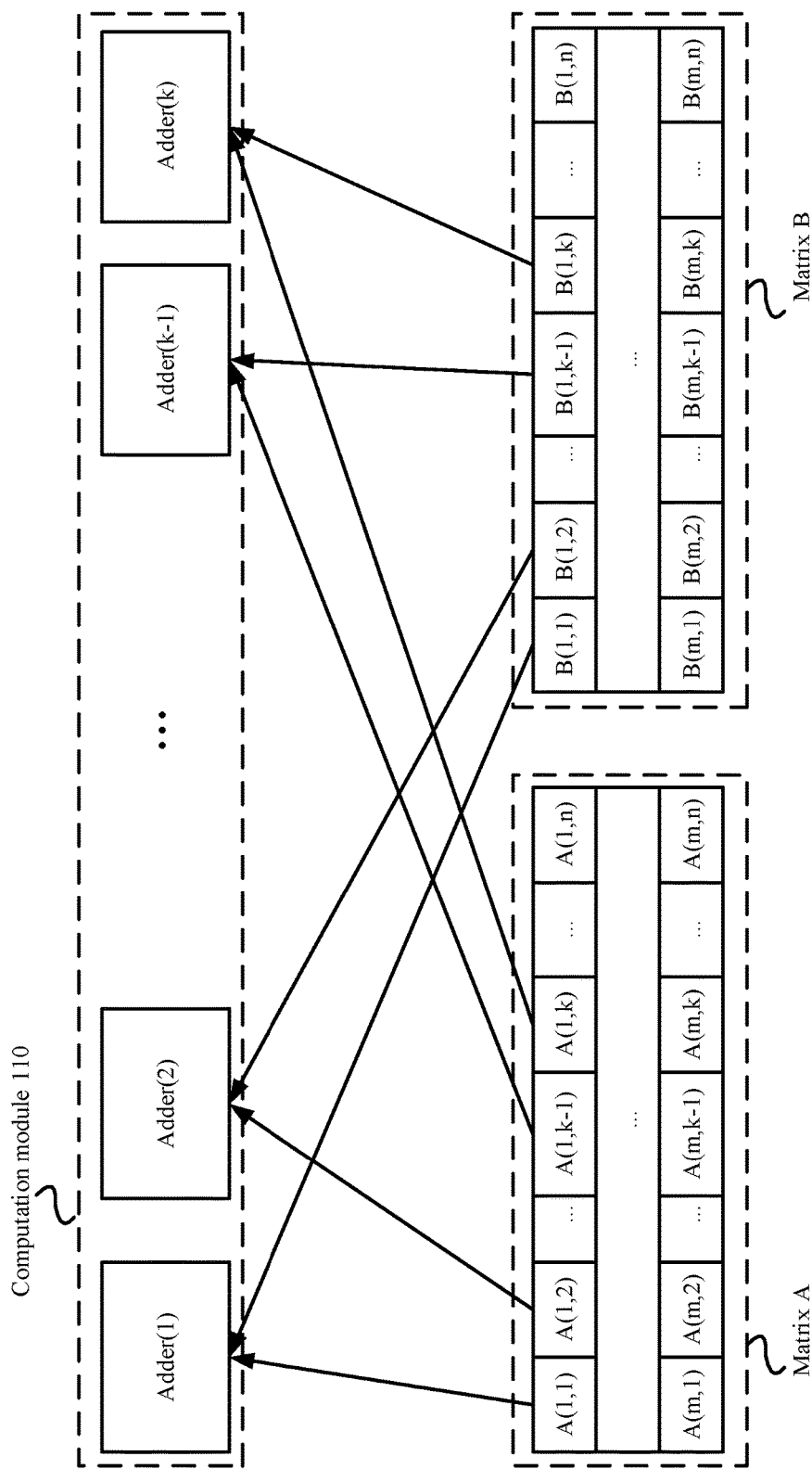
FIG. 2 illustrates an example matrix operation between two matrices that may be performed by the example neural network acceleration processor.

FIG. 2 illustrates an example matrix operation between two matrices that may be performed by the example neural network acceleration processor. As depicted, the first matrix A and the second matrix B may be formatted in an m×n two-dimensional data structure and stored in the matrix caching unit 112. The computation module 110 may include multiple adders (e.g., adder(1) . . . adder(k)). The count of the multiple adders may be less than the count of the entire elements (i.e., k<m×n). Thus, the multiple adders in the computation module may be configured to sequentially process portions of the elements in the first matrix A and the second matrix B. For example, the multiple adders may be configured to add the first k elements (e.g., A(1,1) to A(1,k)) in the first matrix A to the first k elements (e.g., B(1,1) to B(1,k)). After the addition of the first k elements, the multiple adders may be configured to process the next k elements in the first matrix A and the second matrix B.

In the processing of subtraction, the adders of the computation module 110 may be similarly configured to sequentially process the portions of the elements in the first matrix A and the second matrix B.

Figure 3:
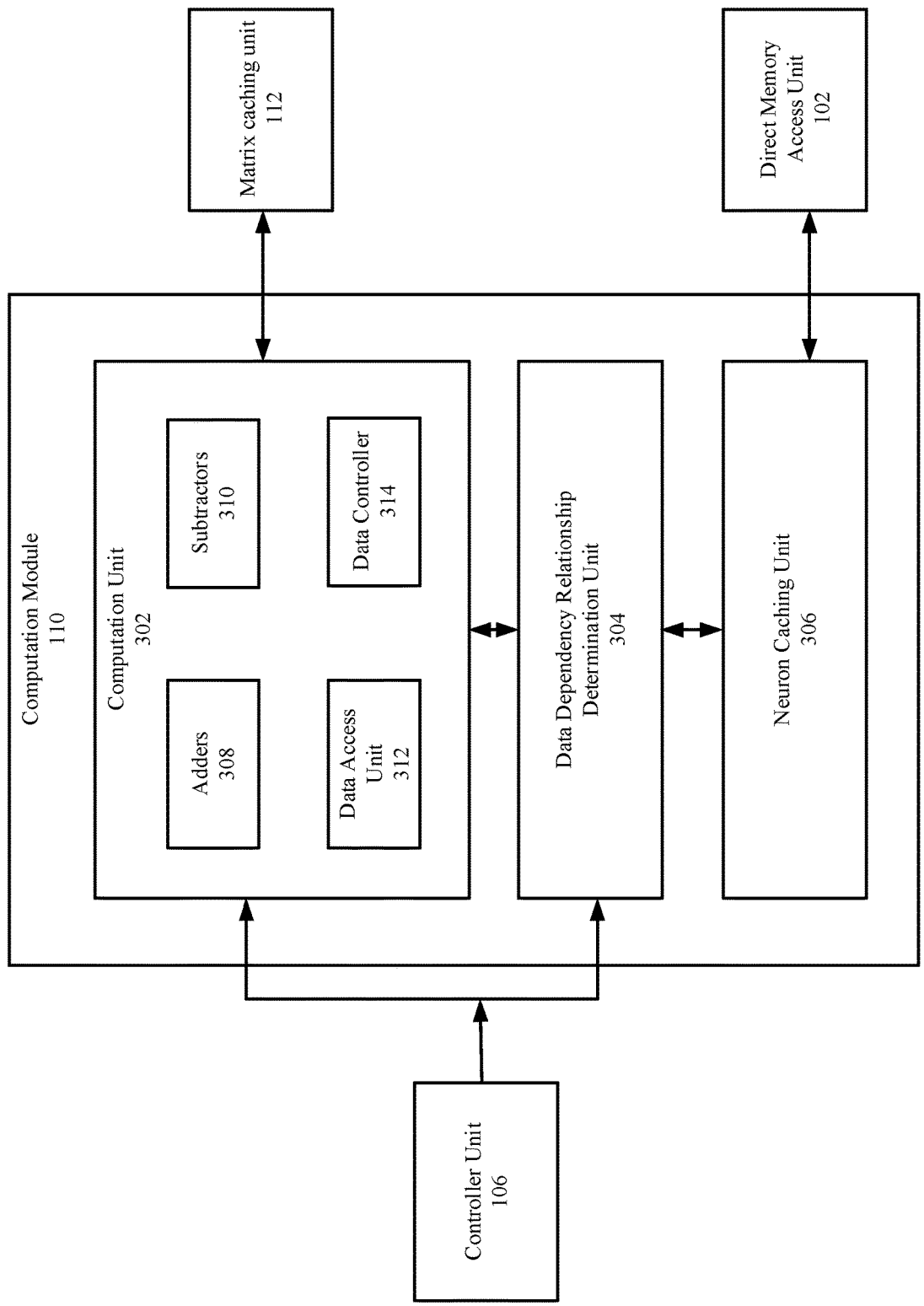
FIG. 3 illustrates an example computation module in the example neural network acceleration processor by which matrix operations may be implemented in a neural network.

FIG. 3 illustrates an example computation module in the example neural network acceleration processor by which matrix operations may be implemented in a neural network. As depicted, the computation module 110 may include a computation unit 302, a data dependency relationship determination unit 304, a neuron caching unit 306. The computation unit 302 may further include one or more adders 308, one or more subtractors 310, a data access unit 312, and a data controller 314.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first matrix A and the second matrix B and the scalar value.

The computation unit 302 may be configured to receive micro-instructions from the controller unit 106 and perform arithmetical logic operations according to the micro-instructions.

In the example that the micro-instructions instruct the computation module 110 to perform an addition for the first matrix A and the second matrix B, the data controller 314 may be configured to select a portion of the elements in the first matrix A and the second matrix B. For example, as described in accordance with FIG. 2, the data controller 314 may be configured to select the first k elements in the first matrix A and the second matrix B. The adders 308 may be configured to respectively add each element in the first k element of the first matrix A to each element in the first k element of the second matrix B. Sequentially, the data controller 314 may be configured to select other portions in the first matrix A and the second matrix B. The adders 308 may be configured to similarly add the elements in the portions accordingly to generate the result matrix.

In the example that the micro-instructions instruct the computation module 110 to perform a subtraction to subtract the second matrix B from the first matrix A, the data controller 314 may be configured to similarly select a portion of the elements in the first matrix A and the second matrix B. For example, as described in accordance with FIG. 2, the data controller 314 may be configured to select the first k elements in the first matrix A and the second matrix B. The subtractor 310 may be configured to respectively subtract each element in the first k element of the second matrix B from each element in the first k elements of the first matrix A. Sequentially, the data controller 314 may be configured to select other portions in the first matrix A and the second matrix B. The subtractor 310 may be configured to similarly subtract the elements of the portions in the second matrix B from the elements of the portions in the first matrix A. In some examples, the subtractor 310 may include one or more inverters to invert the elements in the second matrix B. The inverted elements may be transmitted to the adders 308. The adders 308 may be configured to add the elements from the first matrix A to the inverted elements from the second matrix B to generate the result matrix for the subtraction operation.

In some other examples, the adders 308 may include one or more inverters configure to invert the elements in the second matrix B. As such, the adders 308 may be configured to subtract elements in the second matrix B from the elements in the first matrix A.

In the example that the micro-instructions instruct the computation module 110 to add a scalar value to the first matrix A ("matrix-add-scalar" operation hereinafter) or to subtract the scalar value from the first matrix A ("matrix-minus-scalar" operation hereinafter), the data access unit 312 may be configured to read the scalar value and write the scalar value to each element in the second matrix B. In other words, the second matrix B may be shown as $$\begin{bmatrix} S & S & \cdots & S & \cdots & S \\ S & S & \cdots & S & \cdots & S \\ \vdots & \vdots & \vdots & \vdots & \ddots & \vdots \\ S & S & \cdots & S & \cdots & S \\ \vdots & \vdots & \vdots & \vdots & \vdots & \vdots \\ S & S & \cdots & S & \cdots & S \end{bmatrix}.$$

The adders 308 may then be configured to perform the addition operation between the first matrix A and the second matrix B with the duplicated scalar value as the elements to generate the result for the matrix-add-scalar operation. Similarly, the subtractors 310 may be configured to perform the subtraction operation between the first matrix A and the second matrix B with the duplicated scalar value as the elements to generate the result for the matrix-minus-scalar operation.

The results of the operations performed by the computation unit 302 may be transmitted to the matrix caching unit 112.

Figure 4:
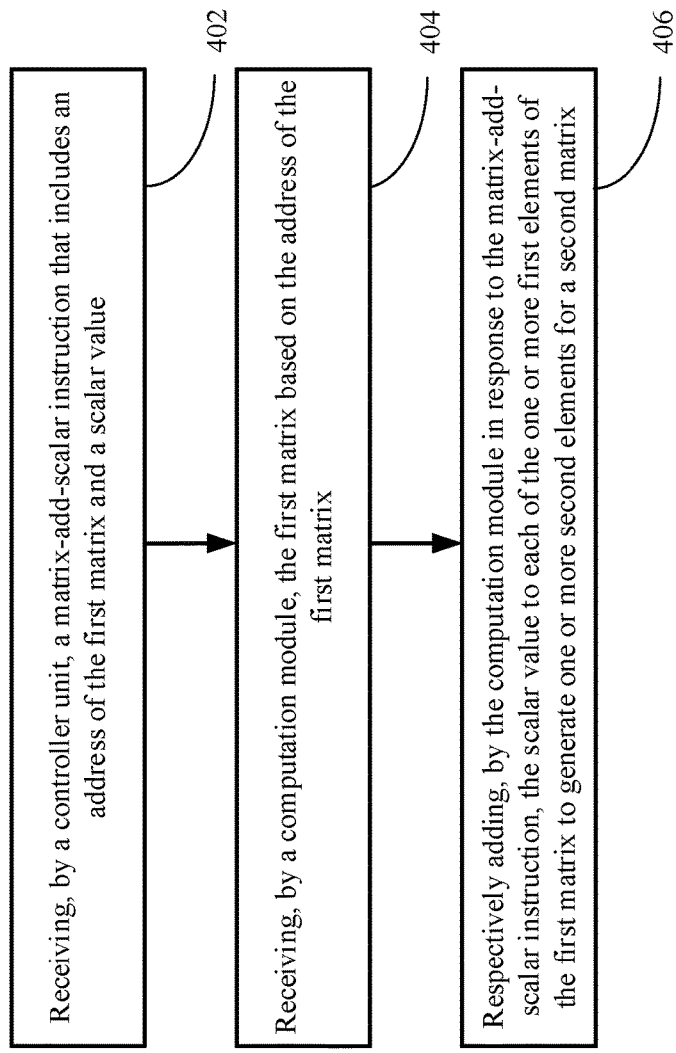
FIG. 4 illustrates flow chart of an example method for matrix operation in a neural network.

FIG. 4 illustrates flow chart of an example method 400 for matrix operation in a neural network. The example method 400 may be performed by one or more components of the apparatus of FIGS. 1 and 3.

At block 402, the example method 400 may include receiving, by a controller unit, a matrix-add-scalar instruction that includes an address of the first matrix and a scalar value. For example, the controller unit 106 may be configured to receive a matrix-add-scalar instruction that indicates an address of a matrix and a scalar value. For example, the matrix-add-scalar instruction may include one or more register IDs that identify one or more registers configured to store the address of the matrix and the scalar value. Alternatively, the matrix-add-scalar instruction may include the immediate values of the address of the matrix and the scalar value.

At block 404, the example method 400 may include receiving, by a computation module, the first matrix based on the address of the first matrix. For example, the computation module 110 may be configured to retrieve the matrix from the direct memory access unit 102 based on the address.

At block 406, the example method 400 may include respectively adding, by the computation module in response to the matrix-add-scalar instruction, the scalar value to each of the one or more first elements of the first matrix to generate one or more second elements for a second matrix. For example, the computation module 110 may be configured to first duplicate the scalar value (hereinafter "S") to each element of the second matrix B and then similarly add the elements in the first matrix A to the second matrix B to generate a result matrix as $$\begin{bmatrix} a_{11}+S & a_{12}+S & \cdots & a_{1i}+S & \cdots & a_{1n}+S \\ a_{21}+S & a_{22}+S & \cdots & a_{2i}+S & \cdots & a_{2n}+S \\ \vdots & \vdots & \vdots & \vdots & \ddots & \vdots \\ a_{j1}+S & a_{j2}+S & \cdots & a_{ji}+S & \cdots & a_{jn}+S \\ \vdots & \vdots & \vdots & \vdots & \vdots & \vdots \\ a_{m1}+S & a_{m2}+S & \cdots & a_{mi}+S & \cdots & a_{mn}+S \end{bmatrix}.$$

Figure 5:
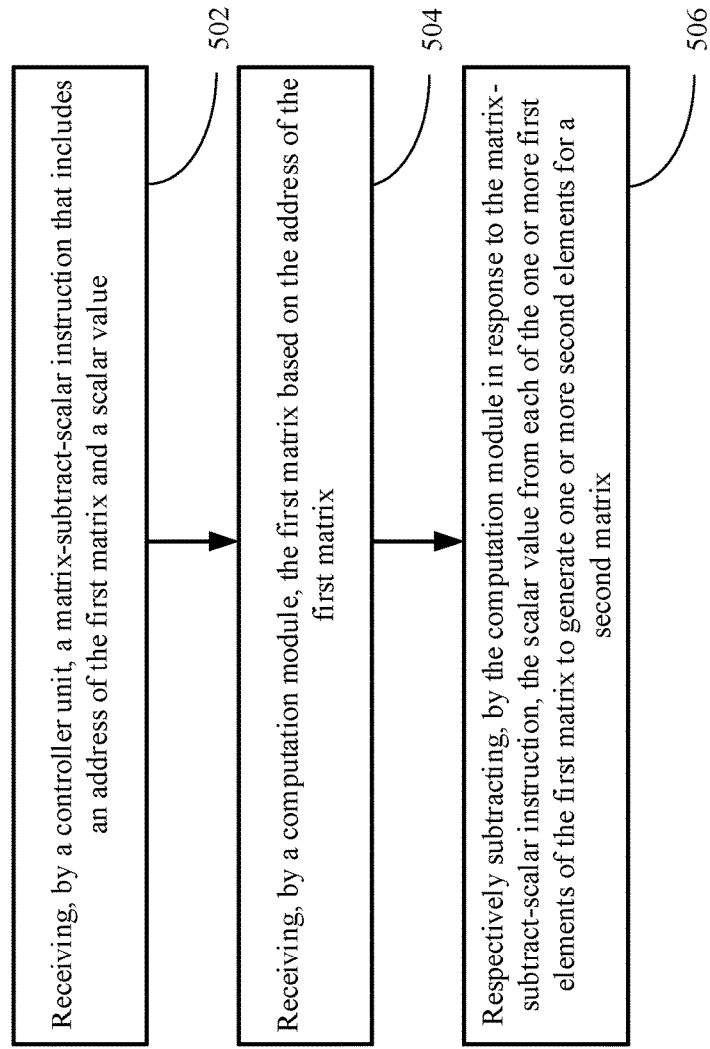
FIG. 5 illustrates flow chart of another example method for matrix operation in a neural network.

FIG. 5 illustrates flow chart of another example method for matrix operation in a neural network. The example method 500 may be performed by one or more components of the apparatus of FIGS. 1 and 3.

At block 502, the example method 500 may include receiving, by a controller unit, a matrix-subtract-scalar instruction that includes an address of the first matrix and a scalar value. For example, the controller unit 106 may be configured to receive a matrix-subtract-scalar instruction that indicates an address of a matrix and a scalar value. For example, the matrix-subtract-scalar instruction may include one or more register IDs that identify one or more registers configured to store the address of the matrix and the scalar value. Alternatively, the matrix-subtract-scalar instruction may include the immediate values of the address of the matrix and the scalar value.

At block 504, the example method 500 may include receiving, by a computation module, the first matrix based on the address of the first matrix. For example, the computation module 110 may be configured to retrieve the matrix from the direct memory access unit 102 based on the address.

At block 506, the example method 500 may include respectively subtracting, by the computation module in response to the matrix-subtract-scalar instruction, the scalar value from each of the one or more first elements of the first matrix to generate one or more second elements for a second matrix. For example, the computation module 110 may also be instructed to perform an operation to subtract a scalar value ("S") from the first matrix A ("matrix-minus-scalar" operation hereinafter) to generate a result matrix as $$\begin{bmatrix} a_{11}-S & a_{12}-S & \cdots & a_{1i}-S & \cdots & a_{1n}-S \\ a_{21}-S & a_{22}-S & \cdots & a_{2i}-S & \cdots & a_{2n}-S \\ \vdots & \vdots & \vdots & \vdots & \ddots & \vdots \\ a_{j1}-S & a_{j2}-S & \cdots & a_{ji}-S & \cdots & a_{jn}-S \\ \vdots & \vdots & \vdots & \vdots & \vdots & \vdots \\ a_{m1}-S & a_{m2}-S & \cdots & a_{mi}-S & \cdots & a_{mn}-S \end{bmatrix}.$$

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for matrix operations in a neural network, comprising:
    a controller circuit configured to receive a matrix-add-scalar instruction that includes an address of a first matrix, a size of the first matrix that indicates a count of one or more first elements in the first matrix, an address of a second matrix, and a scalar value; and
    a computation circuit configured to receive the first matrix from a storage device based on the address of the first matrix in response to the matrix-add-scalar instruction,
wherein the one or more first elements are arranged in accordance with a two-dimensional data structure; and
respectively add the scalar value to each of the one or more first elements of the first matrix in accordance with the matrix-add-scalar instruction to generate one or more second elements for the second matrix.

2. The apparatus of claim 1, wherein the computation circuit includes a data controller circuit configured to select a portion of the first elements.

3. The apparatus of claim 2, wherein the computation circuit includes one or more adders configured to respectively add the scalar value to each of the portion of the first elements.

4. The apparatus of claim 1, further comprising an instruction register configured to store the address of the first matrix, the size of the first matrix, the scalar value, and the address of the second matrix.

5. The apparatus of claim 1, wherein the controller circuit comprises an instruction obtaining circuit configured to obtain the matrix-add-scalar instruction from an instruction storage device.

6. The apparatus of claim 5, wherein the controller circuit further comprises a decoding circuit configured to decode the matrix-add-scalar instruction into one or more micro-instructions.

7. The apparatus of claim 6, wherein the controller circuit further comprises an instruction queue circuit configured to temporarily store the matrix-add-scalar instruction and one or more previously received instructions, and retrieve information corresponding to operation fields in the matrix-add-scalar instruction.

8. The apparatus of claim 7, wherein the controller circuit further comprises an instruction register configured to store the information corresponding to the operation fields in the matrix-add-scalar instruction.

9. The apparatus of claim 8, wherein the controller circuit further comprises a dependency processing circuit configured to determine whether the matrix-add-scalar instruction has a dependency relationship with the one or more previously received instructions.

10. The apparatus of claim 9, wherein the controller circuit further comprises a storage queue circuit configured to store the matrix-add-scalar instruction while the dependency processing circuit is determining whether the matrix-add-scalar instruction has the dependency relationship with the one or more previously received instructions.

11. An apparatus for matrix operations in a neural network, comprising:
a controller circuit configured to receive a matrix-subtract-scalar instruction that includes an address of a first matrix, a size of the first matrix that indicates a count of one or more first elements in the first matrix, an address of a second matrix, and a scalar value; and
a computation circuit configured to
receive the first matrix from a storage device based on the address of the first matrix in response to the matrix-subtract-scalar instruction,
wherein the one or more first elements are arranged in accordance with a two-dimensional data structure; and
respectively subtract the scalar value from each of the one or more first elements of the first matrix in accordance with the matrix-subtract-scalar instruction to generate one or more second elements for the second matrix.

12. The apparatus of claim 11, wherein the computation circuit includes a data controller circuit configured to select a portion of the first elements.

13. The apparatus of claim 12, wherein the computation circuit includes one or more adders configured to respectively subtract the scalar value from each of the portion of the first elements.

14. The apparatus of claim 11, further comprising an instruction register configured to store the address of the first matrix, the size of the first matrix, the scalar value, and the address of the second matrix.

15. The apparatus of claim 11, wherein the controller circuit comprises an instruction obtaining circuit configured to obtain the matrix-subtract-scalar instruction from an instruction storage device.

16. The apparatus of claim 15, wherein the controller circuit further comprises a decoding circuit configured to decode the matrix-subtract-scalar instruction into one or more micro-instructions.

17. The apparatus of claim 16, wherein the controller circuit further comprises an instruction queue circuit configured to temporarily store the matrix-subtract-scalar instruction and one or more previously received instructions, and retrieve information corresponding to operation fields in the matrix-subtract-scalar instruction.

18. The apparatus of claim 17, wherein the controller circuit further comprises an instruction register configured to store the information corresponding to the operation fields in the matrix-subtract-scalar instruction.

19. The apparatus of claim 18, wherein the controller circuit further comprises a dependency processing circuit configured to determine whether the matrix-subtract-scalar instruction has a dependency relationship with the one or more previously received instructions.

20. The apparatus of claim 19, wherein the controller circuit further comprises a storage queue circuit configured to store the matrix-subtract-scalar instruction while the dependency processing circuit is determining whether the matrix-subtract-scalar instruction has the dependency relationship with the one or more previously received instructions.

21. A method for matrix operations in a neural network, comprising:
receiving, by a controller circuit, a matrix-add-scalar instruction that includes an address of a first matrix, a size of the first matrix that indicates a count of one or more first elements in the first matrix, an address of a second matrix, and a scalar value;
receiving, by a computation circuit, the first matrix based on the address of the first matrix in response to the matrix-add-scalar instruction,
wherein the one or more first elements are arranged in accordance with a two-dimensional data structure; and
respectively adding, by the computation circuit in response to the matrix-add-scalar instruction, the scalar value to each of the one or more first elements of the first matrix to generate one or more second elements for the second matrix.

22. The method of claim 21, further comprising selecting, by a data controller circuit of the computation circuit, a portion of the first elements.

23. The method of claim 22, further comprising respectively adding, by one or more adders of the computation circuit, the scalar value to each of the portion of the first elements.

24. The method of claim 21, further comprising an instruction register configured to store the address of the first matrix, an address of the scalar value and an address of the second matrix.

25. The method of claim 21, further comprising obtaining, by an instruction obtaining circuit of the controller circuit, the matrix-add-scalar instruction from an instruction storage device.

26. The method of claim 25, further comprising decoding, by a decoding circuit of the controller circuit, the matrix-add-scalar instruction into one or more micro-instructions.

27. The method of claim 26, further comprising temporarily storing, by an instruction queue circuit of the controller circuit, the matrix-add-scalar instruction and one or more previously received instructions, and retrieve information corresponding to operation fields in the matrix-add-scalar instruction.

28. The method of claim 27, further comprising storing, by an instruction register of the controller circuit, the information corresponding to the operation fields in the matrix-add-scalar instruction.

29. The method of claim 28, further comprising determining, by a dependency processing circuit of the controller circuit, whether the matrix-add-scalar instruction has a dependency relationship with the one or more previously received instructions.

30. The method of claim 29, further comprising storing, by a storage queue circuit of the controller circuit, the matrix-add-scalar instruction while the dependency processing circuit is determining whether the matrix-add-scalar instruction has the dependency relationship with the one or more previously received instructions.

31. A method for matrix operations in a neural network, comprising:
receiving, by a controller circuit, a matrix-subtract-scalar instruction that includes an address of a first matrix, a size of the first matrix that indicates a count of one or more first elements in the first matrix, an address of a second matrix, and a scalar value;
receiving, by a computation circuit, the first matrix based on the address of the first matrix in response to the matrix-subtract-scalar instruction,
wherein the one or more first elements are arranged in accordance with a two-dimensional data structure; and
respectively subtracting, by the computation circuit in response to the matrix-subtract-scalar instruction, the scalar value from each of the one or more first elements of the first matrix to generate one or more second elements for the second matrix.

32. The method of claim 31, further comprising selecting, by a data controller circuit of the computation circuit, a portion of the first elements.

33. The method of claim 32, further comprising respectively subtracting, by one or more adders of the computation circuit, the scalar value from each of the portion of the first elements.

34. The method of claim 31, further comprising an instruction register configured to store the address of the first matrix, an address of the scalar value and an address of the second matrix.

35. The method of claim 31, further comprising obtaining, by an instruction obtaining circuit of the controller circuit, the matrix-subtract-scalar instruction from an instruction storage device.

36. The method of claim 35, further comprising decoding, by a decoding circuit of the controller circuit, the matrix-subtract-scalar instruction into one or more micro-instructions.

37. The method of claim 36, further comprising temporarily storing, by an instruction queue circuit of the controller circuit, the matrix-subtract-scalar instruction and one or more previously received instructions, and retrieve information corresponding to operation fields in the matrix-subtract-scalar instruction.

38. The method of claim 37, further comprising storing, by an instruction register of the controller circuit, the information corresponding to the operation fields in the matrix-subtract-scalar instruction.

39. The method of claim 38, further comprising determining, by a dependency processing circuit of the controller circuit, whether the matrix-subtract-scalar instruction has a dependency relationship with the one or more previously received instructions.

40. The method of claim 39, further comprising storing, by a storage queue circuit of the controller circuit, the matrix-subtract-scalar instruction while the dependency processing circuit is determining whether the matrix-subtract-scalar instruction has the dependency relationship with the one or more previously received instructions.

* * * * *